June 19, 1928. 1,673,883
C. POTESTIO
ALARM AND SIGNAL MECHANISM FOR THE DETECTION OF PUNCTURES OR AIR PRESSURE CHANGES IN PNEUMATIC TIRES
Filed July 9, 1926
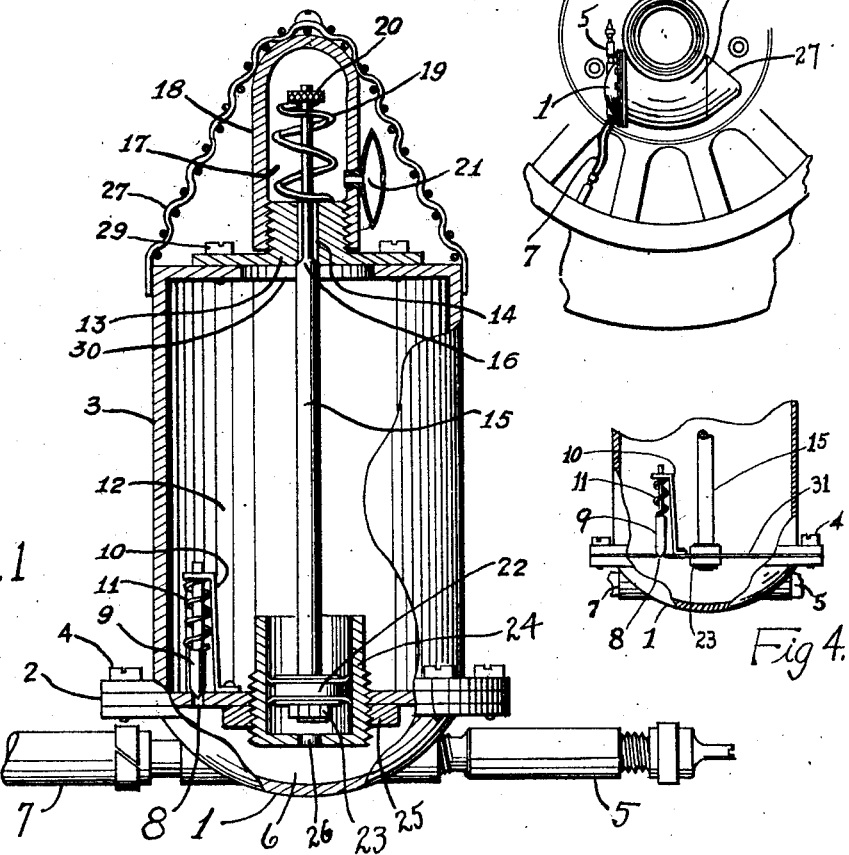
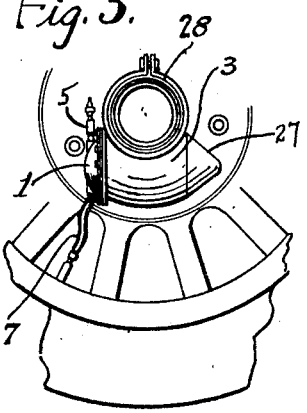
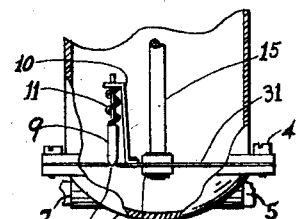
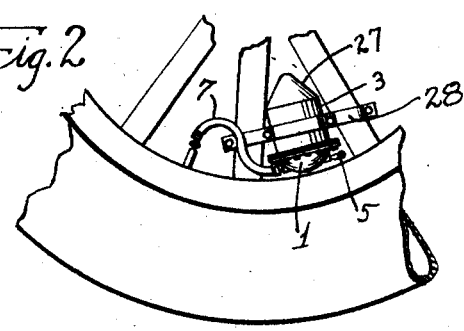
Charles Potestio,
INVENTOR
BY D.A. Highberger
ATTORNEY Patented June 19, 1928.

1,673,883

UNITED STATES PATENT OFFICE.

CHARLES POTESTIO, OF COLUMBIA, UTAH.

ALARM AND SIGNAL MECHANISM FOR THE DETECTION OF PUNCTURES OR AIR-PRESSURE CHANGES IN PNEUMATIC TIRES.

Application filed July 9, 1926. Serial No. 121,479.

The invention contemplates a device having new and useful improvements whereby to provide a means for a signal warning of change of air pressure in pneumatic tires generally used on and about motor driven apparatus. The device is connected to the air valve and is supported by convenient mounting as indicated in the drawings upon the various character of wheel and hub now ordinarily used. The invention consists of the novel constructions, arrangements and formations shown on the drawings and hereinafter described and set forth.

In the drawings Figure 1 is a longitudinal cross section of the device, showing details of its parts and interior; Figure 2 is a showing of the device applied and attached upon the ordinary wood spoke wheel using pneumatic tires; Figure 3 is a showing of the device modified in its outer shape to apply and attach to the hub section of a wheel using pneumatic tires. Figure 4 shows a modification using diaphragm construction.

For a detailed specification of said invention and referring to said drawings, the numeral 1 represents a base upon which a disc 2 and an upper member 3 are secured together to form an air tight joint by the use of the screws 4 as indicated in Figure 1 of the drawing. Air is admitted at the valve 5 filling the space and chamber 6 and passing thru the tube 7 into the regular tire area as indicated in Figures 2 and 3 and it being intended and contemplated that in the attachment of this device the ordinary and usual air valve on the pneumatic tire be removed therefrom to the end that there be no valve between the tire and the device. The disc 2 is provided with an orifice or opening 8 into which a needle valve 9 is fitted, held in place by the guide 10 and the spring 11, so arranged as to permit air passage from the chamber 6 into the chamber 12 but not permitting air return. The upper member 3 is provided with a valve section 13 which is fitted to close the opening 30 in the upper or top area of said member 3 and thru which is an opening 14 adapted to receive a stem valve 15 loosely fitted to admit of a shoulder construction 16 having contact against the lower face of said valve section 13. This stem valve 15 at its upper end is held in position by a coil spring 19 and an adjusting screw 20 adapted to carry and normally hold the valve 15 in its seat 16. When the valve 15 becomes unseated the air will flow freely from the chamber 12 into the chamber 17 formed by a cap 18 screwed to the valve seat section 13 and whereby the escaping air is diverted thru an orifice and whistle indicated at 21. The stem valve 15 is provided at its base or lower end with a double acting plunger 22 preferably of leather packing and held in position securely by the nut 23 and adapted to slidably fit in the cylinder 24. The cylinder 24 is provided with a threaded exterior screwed into the disc 2 and more securely sealed thereon by a lock nut 25, said cylinder 24 having an orifice or opening 26 adapted to permit the passage of air against the lower face of the plunger 22.

Explanatory of the action of the device—when the pneumatic tire is inflated a pressure corresponding to that of the air in the tire is maintained in the chambers 6 and 12, the pressure in the chamber 6 having an upward action upon and against the plunger 22 and at the same time the pressure in the chamber 12 having a downward action upon and against the upper face of the plunger 22 thereby neutralizing the pressures upon and against the said plunger 22. The tension spring 19 adjusted by the screw nut 20 is adapted to give an advantage upward when the air pressure upon the plunger 22 is so neutralized and balanced keeping the valve seat 16 normally closed. When a change or reduction in air pressure in chamber 6 connected with the tire thru the tube 7 comes about by reason of tire puncture or other cause, the greater remaining air pressure in the chamber 12 thrusts the plunger 22 downward thereby overcoming the tension of the spring 19 and unseating the stem valve 15 at its shoulder seat 16 admitting the excess air pressure of said chamber 12 into the air chamber 17 and into and thru the whistle 21 appended to the cap 18 accomplishing the sounding of said whistle as an alarm, signal or warning thereof. A screen cover 27 is applied as a weather protection to the whistle 21 and the upper members of said device. In the Figures 2 and 3, clamps 28 engage the device appropriately to the wheel spokes or hub heretofore referred to.

I also contemplate that a diaphragm may be substituted as and for and in lieu of the plunger 22 and the cylinder 24 and that the stem valve 15 may be attached to said diaphragm numbered 31 and as illustrated in Figure 4 and accomplishing similar result as indicated for and under specification foregoing and it being understood that the orifice 8 with the accompanying check valve 9, guide 10 and spring 11 are used therewith as in the disc construction.

Having thus described the invention I claim—

1. In a tire alarm, a body having an air pressure chamber, a valve for permitting the escape of air therefrom, signal means operable thereby, another pressure chamber, a check valve between the two chambers, means for connecting the latter chamber with the interior of a pneumatic tire, and means for opening said valve, said means being operable by excess of pressure in the first chamber with respect to the other, substantially as described.

2. In a tire alarm, a body having two separate air pressure chambers, means of communication between said chambers, means for connecting one of said chambers with the interior of a pneumatic tire, a valve for permitting escape of air from the other of said chambers, said valve comprising means having opposing pressure surfaces exposed to the interiors of said pressure chambers, and a spring for normally maintaining said valve in closed position and signal means operable by escape of air through said valve, substantially as described.

3. In a tire alarm, a body having an air pressure chamber, a valve for permitting the escape of air therefrom, signal means operable thereby, another pressure chamber, means of communication between said pressure chambers, means for connecting the latter chamber with the interior of a pneumatic tire, and means for opening said valve, said means being operable by excess of pressure in the first chamber with respect to the other, substantially as described.

In testimony whereof I hereunto affix my signature.

CHARLES POTESTIO.